United States Patent [19]

Ruiz Santa Quiteria et al.

[11] Patent Number: 5,798,419
[45] Date of Patent: Aug. 25, 1998

[54] METHOD OF PREPARATION OF COPOLYMERS OF 1,3-BUTADIENE AND STYRENE USEFUL FOR THE PRODUCTION OF TIRES WITH LOW ROLLING RESISTANCE AND COPOLYMERS OF 1,3-BUTADIENE AND STYRENE THUS OBTAINED

[75] Inventors: Valentin Ruiz Santa Quiteria; Juan Antonio Delgado Oyagüe; Luisa Fraga Trillo; Carmen Sierra Escudero, all of Madrid, Spain

[73] Assignee: Repsol Quimica S.A., Madrid, Spain

[21] Appl. No.: 680,425

[22] Filed: Jul. 15, 1996

[30] Foreign Application Priority Data

Jul. 17, 1995 [ES] Spain .................................. 9501431

[51] Int. Cl.⁶ ........................................................ C08F 8/42
[52] U.S. Cl. ...................... 525/370; 525/332.9; 525/371
[58] Field of Search ........................................ 525/370, 371

[56] References Cited

U.S. PATENT DOCUMENTS 4,526,934  7/1985  Oshima et al. .

FOREIGN PATENT DOCUMENTS 493839  7/1992  European Pat. Off. .

*Primary Examiner*—Bernard Lipman
*Attorney, Agent, or Firm*—Ladas & Parry

[57] ABSTRACT

A method of preparation of copolymers of 1,3-butadiene and styrene, useful for the production of tires or elastic materials, characterized by a reduced rolling resistance without detriment to other properties such as skid resistance. The copolymer is prepared using anionic polymerization of 1,3-butadiene and styrene and coupling of part of the chains in star shape with an appropriate compound of tin or silicon, terminating the remainder of the linear chains without coupling using an appropriately selected different compound. The presence of these linear chains terminated with tin yields a beneficial effect in the reduction of rolling resistance when said product is used in tire formulations. The invention also concerns the copolymers of 1,3-butadiene and styrene obtained by said method.

21 Claims, No Drawings

METHOD OF PREPARATION OF COPOLYMERS OF 1,3-BUTADIENE AND STYRENE USEFUL FOR THE PRODUCTION OF TIRES WITH LOW ROLLING RESISTANCE AND COPOLYMERS OF 1,3-BUTADIENE AND STYRENE THUS OBTAINED

The invention concerns a method of preparation of copolymers of 1,3-butadiene and styrene useful for the production of tires with low rolling resistance and 1,3-butadiene and styrene copolymers thus obtained.

STATE OF THE ART

Reducing the rolling resistance of tires without losing other properties such as wet-skid resistance, fundamental to driving safety, is one of the most important objectives pursued by tire manufacturers. Low rolling resistance reduces fuel consumption and, consequently, contributes to the conservation of natural resources. The present invention is devoted to the development of copolymers of 1,3-butadiene and styrene which, as materials used in tire production, yield the desired effect of reducing rolling resistance compared to other materials currently used, without loss of other properties, especially wet-skid resistance.

Various alternatives have been proposed to reduce the rolling resistance of tires which, although they do enable achievement of the desired objective, negatively affect other important properties of the tire, such as abrasion resistance or skid resistance.

Thus, for example, in the state of the art it is known that mixtures of natural rubber and cis-polybutadiene have been proposed which have low rolling resistance, but nevertheless also are marked by a reduction in the wet-skid resistance of tires.

Likewise, in the state of the art, a process has been described to increase the 1,2-vinyl unit content of the 1,3-butadiene-styrene copolymers to reduce rolling resistance, but the properties of the tire are affected, yielding worse abrasion resistance and consequently worsening the wear and service life thereof.

The patent EP 493,839 describes 1,3-butadiene-styrene copolymers prepared with initiators of the formula $Bu_3SnLi$, where Bu represents a butyl radical, Sn a tin atom, and Li a lithium atom. The vulcanized compounds of these copolymers have reduced tan $\delta$ values (tangent of the loss angle in dynamic tests) both at temperatures of 24° C. and 65° C. This means that these compounds have lower rolling resistance, associated with the lower tan $\delta$ in the high temperature zone, but worse skid resistance, as a consequence of the fact that they also have a lower tan $\delta$ at the lower temperature compared to known prior art compounds. This lower skid resistance is undesirable from the standpoint of vehicle driving safety. Moreover, the initiators described are complicated to prepare industrially.

Likewise, in the U.S. Pat. No. 4,526,934, beneficial effects in the reduction of rolling resistance were claimed if there is a coupling of chains of 1,3-butadiene-styrene copolymer with a tin compound ($SnCl_4$), such that these coupled chains specifically have butadiene-tin bonds. Nevertheless, the improvements of rolling resistance which result according to this invention are inadequate. In the current state of the art, the need is felt for copolymers of 1,3-butadiene and styrene which enable production of compounds with lower rolling resistance values, but retain and even increase wet-skid resistance.

Surprisingly, we have discovered a method for obtaining copolymers of 1,3-butadiene and styrene which enables achieving the desired objectives, i.e., an improvement in rolling resistance without degradation of the other properties such as skid resistance. This method results in products consisting of a combination, in appropriate proportions, of star-shaped chains and linear chains with a terminal tin atom, independent of the fact that the bonds are butadiene-tin or any other (for example, styrene-tin, $\alpha$-methylstyrene-tin, isoprene-tin, etc.). The effect of these linear chains with a terminal tin atom along with the presence of star copolymers in the vulcanized compounds is a significant reduction in the $\delta$ at high temperatures (50° to 70° C.), which is associated with lower rolling resistance of the tire and an increase in the $\delta$ at a low temperature (0° C.), associated with the increase in wet-skid resistance compared to other known products of the currently state of the art.

DESCRIPTION

The object of the present invention is a method of synthesis of random butadiene-styrene copolymers using anionic polymerization and coupling and termination thereof with tin compounds.

Also objects of the present invention are the 1,3-butadiene-styrene copolymers in which all their chains are connected to one tin atom, of which at least 30% are linear and the remainder branched in a star shape.

Likewise, an additional object is the preparation of elastomers which, in the compounds vulcanized with carbon black for tires, have a low $\delta$ at temperatures between 50° and 70° C., which translates into low rolling resistance, and a high value of $\delta$ at a temperature of 0C., which translates into high skid resistance.

Consequently, the method to achieve the aforementioned objects with advantages in comparison with the existing current state of the art is disclosed and claimed below, which advantages will be obvious with the specifications and examples which are mentioned below.

The method of polymerization which is the object of the present invention is carried out in the presence of a hydrocarbon solvent. The solvent used is preferably an aliphatic or cycloaliphatic hydrocarbon such as n-pentane, n-hexane, n-heptane, cyclohexane, and the like. This may be mixed with one or more components, with the necessity of the practical absence of impurities such as $CO_2$, $O_2$, water, etc., which may affect the active center of polymerization. The solvent concentration to be used is selected such that it enables good agitation of the mixture and good diffusion of the heat produced during the polymerization reaction. Likewise, the method permits its application both to continuous and discontinuous polymerization processes.

The polymerization temperature may be between 0° and 150° C., preferably between 20 and 120° C. It has been observed that the temperature has an effect on the speed and on the structure of the polymer. Likewise, the reaction may be carried out under both isothermal and adiabatic conditions.

To promote the formation of random copolymers and to control the vinyl addition to the polymers, organic compounds which change its polarity are added to the reaction medium, such as tetrahydrofuran (THF) or N,N,N',N'-tetramethylethylenediamine (TMEDA). The amounts of these polar modifiers may fluctuate between 0.15 and 5 wt.-% based on the reaction mass for the case of THF and 0.01 and 0.5% for the case of TMEDA, as a function of the vinyl content and the degree of alternation of monomers desired in the polymer.

A discontinuous or batch polymerization process of those mentioned above could be performed by loading, into an appropriate reactor for it, the solvent and the monomers followed by the polar compound just described. These reagents are heated to a temperature between 0° and 150° C., initiating the polymerization with an organolithium compound. These organolithium compounds include, for example, alkyl lithiums such as n-butyllithium or sec-butyllithium. The reaction mixture is kept in agitation until all the monomers have reacted, a fact which occurs between 0.1 and 24 hours, depending on the concentrations of reagents and the temperature profile used during the reaction.

Since the copolymerization of 1,3-butadiene and styrene, at adequate concentrations of polar modifier, occurs at random, it is possible to control the type of monomer at the end of the chain by the addition of a quantity of a monomer, between 0.1 and 2% based on the total polymer, capable of reacting with the living polymer species, $P^-Li^+$. Among these polymers are found 1,3-butadiene and styrene themselves, as well as 2-methyl-1,3-butadiene (isoprene) and α-methylstyrene. This makes it possible to obtain, in subsequent chain coupling reactions and termination thereof bonds of a different nature of the type PM-Me, where PM represents the polymer chain terminated with a monomer type M: styrene, butadiene, isoprene, α-methylstyrene, etc., and Me represents a metal Si or Sn in the case of the star-coupled chains and tin alone in the case of the terminated linear chains.

Thus, this type of bond is obtained first by means of coupling of up to 70% as a maximum of star-shaped chains with compounds of the type $Cl_nMeR_{4-n}$ (I), where n represents 3 through 4, Me is Si or Sn, and R is an organic radical of the alkyl, cycloalkyl, or aryl type selected from among radicals with 1to 20 carbon atoms. Among the compounds (I) mentioned are tin tetrachloride, silicon tetrachloride, tin butyl trichloride, silicon butyl trichloride, etc. This reaction enables coupling part of the chains in a star with a central metal atom.

The free chains which remain uncoupled by means of a compound of the type $ClSnR_3$ (II), where R is an organic radical of the alkyl, cycloalkyl, or aryl type, selected from among compounds with 1 to 20 carbon atoms, such as tin tributyl chloride, tin trimethyl chloride, or tin trimethyl chloride. [Translator note: the preceding sentence is incomplete in Spanish.] Thus, a polymer is obtained partly formed in the shape of a star and which contains Sn-polymer or Si-polymer bonds and partly with a linear structure and which is terminated with Sn-polymer bonds.

After verification of the coupling reaction and subsequent termination of chains with the $ClSnR_3$ (II) compound, it is possible to add thereto a quantity between 0.5 and 1.0% (based on polymer weight) of 2,6-di-tert-butyl-p-cresol as a stabilizer or any other agent for that purpose. The polymer may be separated from the solvent by conventional methods known in the state of the art, such as precipitation in alcohol, or elimination of the solvent by vapor entrainment, subsequently moving to its final drying in the drying extruder or appropriate technique for products to be dried.

The product prepared according to the specifications of the present invention, consequently, is made up of a mixture of various polymers. I.e., first, a polymer coupled in the shape of a star (3 or more branches) and whose center is a tin or silicon atom and whose bonds of this metal with the polymer chains may be butadiene-metal, styrene-metal, isoprene-metal, of α-methylstyrene-metal. And, secondly, along with the preceding, playing a major role, a linear polymer, of equal or greater molecular weight than each one of the branches of the previous star, one of whose ends is attached to a tin atom. In the case of the linear polymer, the bond between the polymer chain and the tin may also be selected among the types butadiene-tin, styrene-tin, isoprene-tin, or α-methylstyrene-tin.

As indicated above, this combination of products results in vulcanized materials which have excellent properties in their application in tires, essentially as a consequence of the mixture of a polymer in the shape of a star and another which is linear, with the latter having bonds of the polymer-tin type.

The vulcanizable elastomer compounds may be prepared using a mixture of the polymers mentioned, either alone or in combination with other polymers well known in the state of the art, along with carbon black and other conventional additives, such as charges, plasticizers, antioxidants, curing agents, etc., using the conventional equipment, methods, and proportions well known in the state of the art.

These compounds based on the aforementioned elastomers have a good balance of properties with a perceptible improvement in properties such as such as rolling resistance and wet-skid resistance, which are evaluated using the tangent of the loss angle obtained in the measurement of dynamic properties of the compounds at various temperatures. I.e., it will be understood that good rolling resistance will be based on a relatively low value of the tangent of the loss angle (tan δ) at temperatures between 50° and 70° C., and wet-skid resistance by a relatively low δ value at temperatures between –10° and 10° C.

In the following, illustrative examples of the invention are presented and do not entail any limitation thereof with respect to the specifications previously indicated or the claims of the present invention.

EXAMPLES

Experimental method

All the polymerization tests which are described in the present invention were carried out in a polymerization reactor with a capacity of 20 liters, provided with conditioning systems for nitrogen, venting, and thermostating. Although it is possible to work in a continuous or semicontinuous mode, in this case a batch operation was used, i.e., a discontinuous mode. For it, the raw materials were purified using the methods described in the state of the art (for example, distillation, drying, etc.) and a dissolution of styrene and butadiene in cyclohexane was loaded into said reactor along with TMEDA or THF as polar modifiers, then using the thermostating system to control the temperature of the test. Once this is reached, the initiator is added, in this case n-butyllithium, and the reaction is permitted to continue adiabatically, with a minimum temperature increase of 30° C. The conversion of the monomers is monitored using gas chromatography until the total absence of monomers in the reaction medium is observed, after which the reactions of coupling and termination of the free linear chains are performed. Finally, the antioxidant is added, followed by the discharge and separation of the product from the solvent using the methods mentioned.

Then, a series of structural parameters and physical properties are measured. The vinyl and styrene content of the styrene-butadiene copolymers (SBRs) are determined by $^1H$-NMR and $^{13}C$-NMR spectrography.

The molecular weights of the SBRs, as well as the proportion of star polymer (% of coupled polymer) are determined using gel permeation chromatography (GPC.), based on a calibration curve of polystyrene samples.

The compounds are prepared in a roller mixer according to the recipe in the following Table 1 and as described in the standard ASTM D-3182. They are then vulcanized at 150° C. for 15 minutes.

TABLE 1

| Formulation of compounds prepared | |
| --- | --- |
| Polymer | 100 |
| Carbon black N375 | 50 |
| ZnO | 4 |
| Stearic acid | 2 |
| Aromatic oil | 8 |
| N-(1,3-dimethyl buytl)-N'-phenyl phenylenediamine | 1 |
| Phenyl-alpha-naphthylamine | 1.5 |
| N-cyclohexyl-2-benzothiazyl-sulfenamide | 1.5 |
| Sulfur | 1.8 |

The Mooney viscosity (ML4) of the SBRs was measured using a Monsanto Mooney viscometer, per the method described in the standard ASTM D-1646.

The tension-deformation measurements of the vulcanized SBRs were obtained on a Monsanto dynamometer per the method described in the standard ASTM D-412.

The dynamic properties of the vulcanized [SBRs] were measured with a Metravib Viscoanalyzer in the traction/compression mode. The measurements of the tangent of the loss angle (tan δ) at 50° to 70° C. (rolling resistance index) and at 0° C. (wet-skid resistance index) were obtained in a constant deformation mode of 0.3% and a deformation frequency of 16 Hz.

Example 1 (Comparative)

This example corresponds to the synthesis of a 1,3-butadiene-styrene copolymer prepared according to the prior art. The product consists in a mixture of chains coupled in the shape of a star with a central tin atom and linear chains without any type of metal termination. For this, 850.5 g of dissolution of styrene at 45.4% (p/p) in cyclohexane, 1197.0 g of 1,3-butadiene, and 8983.0 g of cyclohexane were placed in a reactor with a capacity of 20 liters. 33.74 g of tetrahydrofuran as a polar modifier was added to this mixture of monomers. Under continuous agitation, the reaction mass was thermostated to 45° C., after which and through the addition of 0.88g (13.8 mmol) of n-butyllithium as an initiator, along with an additional quantity to neutralize reactor poisons, the reaction continued for 12 minutes with a temperature increase in the reaction mass of 55° C. Upon verification of the total conversion of the monomers using gas chromatography (GC), 0.504 g (1.9 mmol) of $SnCl_4$ was added and allowed to react for 10 minutes for the purpose of coupling part of the polymer chains in the shape of a star. After this period of time, 12 g of 2,6di-tert-butyl-p-cresol was added to terminate the uncoupled chains and as an antioxidant. The sample thus obtained was isolated from the solvent for subsequent analysis and preparation of the formulations and their vulcanizations.

Example 2

A polymerization test analogous to that described in Example 1, but modified so as to obtain a mixture of chains coupled in the shape of a star with a central nucleus of butadiene-tin and linear chains with a butadiene-tin termination. For this, the same loading and polymerization guidelines were followed; however, when the total conversion of the monomers was reached, 15 g of 1,3-butadiene was added and was allowed to react for 5 minutes to ensure the presence of polymerized butadiene units at the termination of the SBR (1,3-butadiene-styrene polymer) chains formed. Then, the same method of coupling of the chains in the shape of a star was followed, by adding 0.504 g (1.9 mmol) of $SnCl_4$ and allowing this to react for 10 minutes. Finally, and also differently from Example 1, to terminate the linear chains not coupled in the preceding step, 3.15 g of tin tributyl chloride ($ClSnBu_3$) was used such that the chains would have bonds of the tin-butadiene type. And last of all, 10 g of 2,6-di-tert-butyl-p-cresol was added solely as an antioxidant. The sample thus obtained was isolated for its subsequent analysis and characterization of the compounds formulated and vulcanized.

The results of the evaluation of these polymers are found in Table II, where the differences in tangent of the loss angle (tan δ) are calculated at various temperatures in comparison to the sample from Example 1:

TABLE II

| Evaluation of samples from Examples 1-3 in compounds | | |
| --- | --- | --- |
| | Example 1 (Comparative) | Example 2 |
| Microstructure: | | |
| % styrene | 25.6 | 25.4 |
| % 1, 2(*) | 32.6 | 31.7 |
| Molecular weight distribution (GPC): | | |
| Mw $10^3$ | 252 | 267 |
| Mn $10^3$ | 164 | 167 |
| Mw/Mn | 1.5 | 1.6 |
| % of polymer coupled | 43.5 | 43.8 |
| $M_{1+4}$ at 100° C.(**) | 49 | 49 |
| Vulcanized compounds (15 min/150° C.): | | |
| Traction resistance, MPa | 22.2 | 26.0 |
| % Elongation at rupture | 545 | 550 |
| tan δ 0° C. | 0.199 | 0.239 |
| tan δ 50° C. | 0.164 | 0.145 |
| tan δ 70° C. | 0.158 | 0.128 |
| % Δtan δ 0° C.(***) | — | 20.1 |
| % Δtan δ 50° C.(***) | — | −11.6 |
| % Δtan δ 70° C.(***) | — | −19.0 |

(*)based on the polybutadiene fraction
(**)of the polymer
(***)variation in the % with respect to Example 1 (comparative)

In light of the results in Table II, it is observed that a significant improvement occurs in the properties of the compound when using the sample which is prepared according to Example 2, in which the linear chains with a tin atom on their end are found in combination with chains also coupled in this case with tin. In this sense an increase in the tangent δ of up to 20% is observed in the low temperature zone (0° C.), which is associated with better behavior in skid resistance, whereas on the contrary, a reduction which also approaches 20% is observed in the value of this parameter at a high temperature (70° C.), which is associated with an improvement in the rolling resistance, relative to the comparative sample in Example 1 already existing in the prior art. This reduction in the rolling resistance will in turn translate into lower fuel consumption and, consequently, into a reduction in the volume of atmosphere contaminating emissions.

Example 3 (Comparative)

This is a sample prepared according to the known technique, more specifically according to the description in the U.S. Pat. No. 4,526,934. The product consists in a mixture of chains coupled in a star shape with a central nucleus of tin-butadiene and linear chains without a specific termination. Its objective is to enable its comparison with the examples which will be described in the following covered by the present invention, prepared and vulcanized in one and the same series of tests. For this, a reactor with a 20-liter capacity is loaded with 622.9 g of a styrene dissolution at 58% (p/p) in cyclohexane, 1123.0 g of 1,3-butadiene, and 8700.0 g of cyclohexane. 42.4 g of tetrahydrofuran is added to this monomer mixture as a polar modifier. Following the same method of polymerization as that described in Example 1, 0.74 g (11.5 mmol) of n-butyllithium is added as a polymerization initiator along with an additional amount to neutralize reactor poisons. The reaction continues for approximately 10 minutes, with a temperature increase of the reaction mass of 60° C. After verifications of the total conversion of monomers using gas chromatography (GC), 13 g of 1,3-butadiene is added and allowed to react for 5 minutes in order to ensure butadiene units on the end of the chains. Finally, 0.43 g (1.68 mmol) of tin tetrachloride is added and allowed to react for 10 minutes for the purpose of obtaining chains coupled in the shape of stars. Once this time has elapsed, 12 g of 2,6-di-tert-butyl-p-cresol was added as a terminator of chains not coupled and as an antioxidant. The sample thus obtained was isolated from the solvent for subsequent analysis and evaluation of the formulations and their vulcanized products.

Example 4

This is another sample similar to that described in Example 2 for comparison in one and the same series of vulcanized products with the following. Thus, a mixture of chains coupled in the shape of stars with a central nucleus of butadiene tin and linear chains with a butadiene-tin termination. According to the same loading and polymerization steps, when the total conversion of the monomers is obtained, 13 g of 1,3-butadiene is likewise added and is allowed to react for 5 minutes to ensure the presence of units of butadiene at the terminations of the SBR polymer chains formed. Then, the same coupling method of star-shaped chains continues by means of the addition of 0.43 g (1.68 mmol) of $SnCl_4$ and this is allowed to react for 10 minutes. Finally, and in contrast to Example 3, to terminate the linear chains not coupled in the previous stage, 2.06 g of tin tributyl chloride ($ClSnBu_3$) is used such that the linear chains have bonds of the butadiene-tin type. And last of all, 10 g of 2,6-di-tert-butyl-p-cresol was added solely as an antioxidant. The sample thus obtained was isolated for subsequent analysis and characterization of the compounds formulated and vulcanized.

Example 5

Another polymerization test analogous to that described in Example 4 was performed but with the difference that a mixture of chains coupled in a star shape with a central tin nucleus is obtained, without a specific monomer linked with the metal, and linear chains with a tin butadiene termination. For this, when total conversion of the monomers is obtained, the reaction of the coupling of star-shaped chains is begun, without the addition of 1,3-butadiene or another monomer. 0.43 g (1.68 mmol) of tin tetrachloride $SnCl_4$ is added, which is allowed to react for 10 minutes. Finally, 13 g of 1,3-butadiene is added to terminate the chains not coupled with units of this monomer, allowing it to react for 5 minutes, and to terminate the linear chains not coupled, 2.06 g of tin tributyl chloride ($ClSnBu_3$) is added. Thus, only the linear chains have bonds of the butadiene-tin type. And last of all, 10 g of 2,6di-tert-butyl-p-cresol was added solely as an antioxidant. The sample thus obtained was isolated for subsequent analysis and characterization of the compounds formulated and vulcanized.

Example 6

Another polymerization test analogous to that described in Example 4 was performed but with the differences necessary to obtain a mixture of chains coupled in a star shape with a central tin-isoprene nucleus and with linear chains with a tin-isoprene termination. Following the same steps of loading and polymerization and, contrary to Example 4, when total conversion of the monomers is obtained, 18 g of 2-methyl-1,3-butadiene (isoprene) is added and allowed to react for 5 minutes to ensure the presence of isoprene units at the end of the chains of the SBR polymer formed. Then, the same method of the coupling of star-shaped chains is begun, with the addition of 0.43 g (1.68 mmol) of tin tetrachloride ($SnCl_4$) and allowed to react for 10 minutes. Analogously to Example 5, to terminate the chains not coupled in the preceding step, 2.06 g of tin tributyl chloride. ($ClSnBu_3$) is added such that both the linear chains and the branched chains have bonds of the isoprene-tin type. And finally, 10 g of 2,6-di-tert-butyl-p-cresol was added, solely as an antioxidant. The sample thus obtained was isolated for subsequent analysis and characterization of the compounds formulated and vulcanized.

Example 7

Another polymerization test analogous to that described in Example 4 was performed but with the differences necessary to obtain a mixture of chains coupled in a star shape with a central α-methylstyrene-tin nucleus and linear chains with a α-methylstyrene-tin termination. Following the same steps of loading and polymerization and, contrary to Example 4, when total conversion of the monomers is obtained, 20 g of α-methylstyrene is added and allowed to react for 5 minutes to ensure the presence of α-methylstyrene units at the end of the chains of the SBR polymer formed. Then, the same method of the coupling of star-shaped chains is begun, with the addition of 0.43 g (1.68 mmol) of tin tetrachloride ($SnCl_4$) is added and allowed to react for 10 minutes. Analogously to Example 5, to terminate the chains not coupled in the preceding step, 2.06 g of tin tributyl chloride ($ClSnBu_3$) is added such that both the linear chains and the branched chains have bonds of the α-methylstyrene-tin type. And finally, 10 g of 2,6-di-tert-butyl-p-cresol was added, solely as an antioxidant. The sample thus obtained was isolated for subsequent analysis and characterization of the compounds formulated and vulcanized.

The results of the evaluation of these polymers Examples 3 through 7) are presented in Table III. In light of the results, it is observed that in all the cases there is a significant improvement in the properties of the compound with the presence of linear chains terminated with tin bonds compared to those in which this type of bonds do not appear in the linear fraction of the polymer. This is obvious from the reduction with respect to the reference sample (comparative Example 3) of the δ at a high temperature (70° C.), which is associated with a lower rolling resistance. Analogously, there is an effect of improvement in the skid resistance, as reflected in the increase of the values of δ at a low temperature (0° C.). The effect is produced to a larger extent for those which have linear chains of the butadiene and isoprene type, being somewhat less pronounced in the case of the α-methylstyrene-tin.

TABLE III

Evaluation of samples of Examples 3-7 in compounds

| | Examples | | | | |
|---|---|---|---|---|---|
| | 3 (Comparative) | 4 | 5 | 6 | 7 |
| Microstructure: | | | | | |
| % styrene | 25.2 | 25.1 | 24.4 | 23.0 | 23.9 |
| % 1,2(*) | 32.0 | 34.5 | 34.3 | 35.5 | 33.1 |
| Molecular weight (GPC): | | | | | |
| Mw $10^{-3}$ | 265 | 275 | 265 | 265 | 278 |
| Mn $10^{-3}$ | 167 | 176 | 167 | 163 | 171 |
| Mw/Mn | 1.6 | 1.6 | 1.6 | 1.6 | 1.6 |
| % coupled | 44 | 44 | 45 | 42 | 50 |
| $ML_{1+4}$ at 100° C.(**) | 53 | 57 | 51 | 51 | 56 |
| Vulcanized compound (15 min,150° C.): | | | | | |
| Traction resistance, MPa | 22.5 | 22.6 | 21.9 | 21.6 | 19.4 |
| % elongation at rupture | 450 | 440 | 430 | 440 | 400 |
| tan δ 0° C. | 0.245 | 0.276 | 0.268 | 0.277 | 0.268 |
| tan δ 50° C. | 0.167 | 0.148 | 0.146 | 0.148 | 0.158 |
| tan δ 70° C. | 0.147 | 0.124 | 0.122 | 0.125 | 0.137 |
| % Δtan δ 0° C.(***) | — | 12.7 | 9.4 | 13.1 | 9.4 |
| % Δtan δ 50° C.(***) | — | 11.3 | −12.5 | 11.4 | −5.4 |
| % Δtan δ 70° C.(***) | — | −15.6 | −17.0 | −15.0 | −6.8 |

(*)based on the polybutadiene fraction
(**)of the polymer
(***)variation in the % with respect to Example 3 (compartive)

Example 8 (Comparative)

This consists in a example in which the polar modifier is tetramethylethylenediamine (TMEDA). For this, 540 g of dissolution of styrene at 58% (p/p) in cyclohexane, 940 g of 1,3-butadiene, and 9000 g of cyclohexane are loaded into a reactor with a capacity of 20 liters. 4 g of TMEDA is added as a polar modifier to this mixture of monomers and solvent. Following the same method as in the preceding examples, the reaction mass was heated to 35° C., then 0.74 g (11.5 mmol) of n-butyllithium was added as a polymerization initiator, along with an additional amount to neutralize the reactor poisons. The reaction continued for approximately 10 minutes with a temperature increase of approximately 60° C. After verification of the conversion by the method indicated in the previous examples, 15 g of 1,3-butadiene was added and allowed to react for 5 minutes. Finally, 0.52 g (2.02 mmol) of tin tetrachloride was added and allowed to react for 10 minutes in order to obtain star-shaped coupled chains. After this time elapsed, 12 g of 2,6-di-tert-butyl-p-cresol was added as a termination of chains not coupled and as an antioxidant. The sample thus obtained was isolated for subsequent analysis and evaluation of the formulations and their vulcanized products.

Example 9

This is an example of an object of the present invention in which the modifier used is TMEDA; in which a mixture of star-shaped coupled chains with a central nucleus of tin-butadiene and linear chains with an end terminated in tin-butadiene is obtained. Following the same steps of loading and polymerization as in Example 8 (comparative), when total monomer conversion is obtained, 15 g of 1,3-butadiene is also added and made to react for 5 minutes in order to ensure the presence of butadiene units at the end of the SBR chains formed. Then, the same method of coupling of star-shaped chains is followed with the addition of 0.52 g (2.02 mmol) of tin tetrachloride and this is allowed to react for 10 minutes. Finally, and in contrast to the preceding example, to terminate the chains not coupled in the preceding step, 2.06 g of tin tributyl chloride ($ClSnBu_3$) is added such that the linear chains have bonds of the butadiene-tin type. And finally, 8 g of 2,6-di-tert-butyl-p-cresol was added, solely as an antioxidant. The sample thus obtained was isolated for subsequent analysis and characterization of the compounds formulated and vulcanized.

The results of the evaluation of these polymers (Examples 8 and 9) are in Table IV. In this case, in contrast to the preceding examples (1–7), it is observed that the use of the polar modifier TMEDA results in greater values of vinyl addition (% 1.2). Likewise, although the addition of vinyl is greater, the best properties of the compound are also observed in the sample in which there are linear chains with tin bonds. I.e., for Sample 9, there is a significant reduction in the tan δ at a high temperature (70° C.), which is associated with a lower rolling resistance of a tire which is produced with this compound compared to the reference sample (Example 8) without this type of tin bonds in the linear chains. Likewise, an improvement in the skid resistance is observed, as reflected in the increase of the values of δ at a low temperature (0° C.).

TABLE IV

Evaluation of samples from Examples 8-9 in compounds

| | Example 8 (Comparative) | Example 9 |
|---|---|---|
| Microstructure: | | |
| % styrene | 26.0 | 25.0 |
| % 1,2 (*) | 53.0 | 55.0 |

TABLE IV-continued

Evaluation of samples from Examples 8–9 in compounds

|  | Example 8 (Comparative) | Example 9 |
|---|---|---|
| Molecular weight distribution (GPC): | | |
| Mw 10³ | 316 | 319 |
| Mn 10³ | 192 | 187 |
| Mw/Mn | 1.64 | 1.70 |
| % coupled | 45 | 52 |
| $ML_{1+4}$ at 100° C.(**) | 56 | 52 |
| Vulcanized compounds (15 min/150° C.): | | |
| Traction resistance, MPa | 17.6 | 18.1 |
| % Elongation at rupture | 380 | 380 |
| tan δ 0° C. | 0.416 | 0.465 |
| tan δ 50° C. | 0.170 | 0.155 |
| tan δ 70° C. | 0.152 | 0.130 |
| % Δtan δ 0° C.(***) | — | 11.8 |
| % Δtan δ 50° C.(***) | — | 8.8 |
| % Δtan δ 70° C.(***) | — | 14.5 |

(*)based on the Polybutadiene fraction
(**)of the polymer
(***)variation in the % with respect to Example 1 (comparative)

It is thus clear based on the examples mentioned and the specifications gathered that the vulcanized products of a mixture of molecules in the shape of a star with a central tin atom and linear molecules with an tin atom at their termination permit an improvement in rolling resistance without prejudice to other properties, compared to that in which the linear molecules do not have this type of tin atoms at their termination. This improvement may be obtained by a variety of types of tin bonds of polymer chains, such as, butadiene-tin, α-methylstyrene-tin, isoprene tin, etc.

Likewise, based on the examples and specifications, it is possible to select the best processing conditions to obtain the desired effect. Consequently, it must be understood that the present invention is not restricted to the examples indicated since they are only to describe and demonstrate the process and the products with their improvements compared to other known processes and products. That is why the scope of the present invention shall include all the modifications and variations which are included within the following claims:

We claim:

1. A method of preparation of copolymers of 1,3-butadiene and styrene useful for the production of tires with low rolling resistance, the method comprising:
   a. anionic polymerization of the styrene and 1,3-butadiene monomers in a solvent using a lithium alkyl initiator and in the presence of a polar modifier, under inert conditions and at temperatures between 0° and 150° C., preferably between 20° and 120° C.;
   b. followed by optionally adding us to 2% by weight of a terminal monomer selected from among the monomers which comprise the copolymer or another selected from among the conjugated dienes or aromatic vinyl compounds;
   c. followed by a coupling reaction of a maximum of 70% of star-shaped chains using the halide compound of tin or silicon of the formula $Cl_nMeR_{4-n}$ (I), where n represents 3 through 4, Me is Si or Sn, and R is an organic radical of the alkyl, cycloalkyl, or aryl type selected from among radicals with 1 to 20 carbon atoms;
   d. followed by optionally adding us to 2% by weight of a terminal monomer, with respect to the remainder of the polymer, selected from among one of the monomers which comprise the copolymer and another selected from among the conjugated dienes or aromatic vinyl compounds; and
   e. followed by a termination reaction of the linear chains using a compound of the type $ClSnR_3$ (II), where R is an organic radical of the alkyl, cycloalkyl, or aryl type, selected from among compounds with 1 to 20 carbon atoms.

2. A method according to claim 1, characterized in that step c. is carried out with tin tetrachloride, $SnCl_4$.

3. A method according to claim 1, characterized in that step c. is carried out with silicon tetrachloride, $SiCl_4$.

4. A method according to claim 1, characterized in that the styrene content may be between 5 and 35%.

5. A method according to claim 1, characterized in that said solvent is cyclohexane or a mixture of cyclohexane with alkane isomers with 5 to 10 carbon atoms.

6. A method according to claim 1, characterized in that the alkyl lithium compound is sec-butyllithium.

7. A method according to claim 1, characterized in that the alkyl lithium compound is n-butyllithium.

8. A method according to claim 1, characterized in that the polar modifier is tetrahydrofuran.

9. A method according to claim 1, characterized in that the polar modifier is N,N,N',N'-tetramethylethylenediamine.

10. A method according to claim 8, characterized in that the tetrahydrofuran concentration in the reaction mass is between 0.15 and 5%.

11. A method according to claim 9, characterized in that the N,N,N',N'-tetramethylethylenediamine concentration in the reaction mass is between 0.01 and 0.5%.

12. A method according to claim 1, characterized in that said terminal monomer is styrene.

13. A method according to claim 1, characterized in that said terminal monomer is 1,3-butadiene.

14. A method according to claim 1, characterized in that said terminal monomer is 2-methyl-1,3-butadiene.

15. A method according to claim 1, characterized in that said terminal monomer is α-methylstyrene.

16. A method according to claim 1, characterized in that the linear chains are terminated with tin tributyl chloride.

17. A method according to claim 1, characterized in that the linear chains are terminated with tin trimethyl chloride.

18. A method according to claim 1, characterized in that the linear chains are terminated with tin trimethyl chloride.

19. A method as claimed in claim 1, wherein the copolymer of 1,3-butadiene and styrene has chains, a maximum of 70% of the chains being branched in a star structure and at least 30% of the chains having a linear structure, with all the linear chains containing a tin atom at their end.

20. A method as claimed in claim 1, wherein the copolymer of 1,3-butadiene and styrene has chains, all of the chains being connected to a tin atom, at least 30% of the chains being linear, and the remaining chains being branched in a star shape.

21. A method of preparation of copolymers of 1,3-butadiene and styrene useful for the production of tires with low rolling resistance, the method comprising:
   a. anionic polymerization of the styrene and 1,3-butadiene monomers in a solvent using a lithium alkyl initiator and in the presence of a polar modifier, under inert conditions and at temperatures between 0° and 150° C., preferably between 20° and 120° C.;
   b. followed by adding up to 2% by weight of a terminal monomer selected from among the monomers which comprise the copolymer or another selected from among the conjugated dienes or aromatic vinyl compounds;

c. followed by a coupling reaction of a maximum of 70% of star-shaped chains using the halide compound of tin or silicon of the formula $Cl_nMeR_{4-n}$ (I), where n represents 3 through 4, Me is Si or Sn, and R is an organic radical of the alkyl, cycloalkyl, or aryl type selected from among radicals with 1 to 20 carbon atoms;

d. followed by adding up to 2% by weight of a terminal monomer, with respect to the remainder of the polymer, selected from among one of the monomers which comprise the copolymer and another selected from among the conjugated dienes or aromatic vinyl compounds; and e. followed by a termination reaction of the linear chains using a compound of the type $ClSnR_3$ (II), where R is an organic radical of the alkyl, cycloalkyl, or aryl type, selected from among compounds with 1 to 20 carbon atoms.

* * * * *